(12) United States Patent
Hellin Navarro et al.

(10) Patent No.: US 10,738,960 B1
(45) Date of Patent: Aug. 11, 2020

(54) INTERCHANGEABLE LOGO COURTESY LAMP

(71) Applicant: FICOSA NORTH AMERICA CORPORATION, Madison Heights, MI (US)

(72) Inventors: Sergio Hellin Navarro, Bloomfield Hills, MI (US); Norbert Anthony Bikos, Oakland Township, MI (US)

(73) Assignee: FICOSA NORTH AMERICA CORPORATION, Madison Heights, MI (US)

( * ) Notice: Subject to any disclaimer, the term of this patent is extended or adjusted under 35 U.S.C. 154(b) by 0 days.

(21) Appl. No.: 16/506,503

(22) Filed: Jul. 9, 2019

(51) Int. Cl.
| | | |
|---|---|---|
| *B60Q 1/00* | (2006.01) | |
| *B60Q 3/00* | (2017.01) | |
| *B60Q 11/00* | (2006.01) | |
| *F21S 43/20* | (2018.01) | |
| *F21S 45/50* | (2018.01) | |
| *F21S 43/27* | (2018.01) | |
| *F21V 17/00* | (2006.01) | |
| *B60R 1/12* | (2006.01) | |
| *B60Q 1/24* | (2006.01) | |
| *F21W 103/60* | (2018.01) | |
| *B60R 1/06* | (2006.01) | |

(52) U.S. Cl.
CPC ............ *F21S 43/26* (2018.01); *B60Q 1/0017* (2013.01); *B60Q 1/24* (2013.01); *B60R 1/12* (2013.01); *F21S 43/27* (2018.01); *F21S 45/50* (2018.01); *F21V 17/002* (2013.01); *B60Q 2400/50* (2013.01); *B60R 1/06* (2013.01); *B60R 2001/1215* (2013.01); *F21W 2103/60* (2018.01)

(58) Field of Classification Search
CPC .......... B60Q 1/017–24; B60Q 2400/50; B60R 1/02–12; B60R 2001/1215; F21S 43/255–51; F21W 2103/60
USPC ................................ 362/494, 509, 512, 540
See application file for complete search history.

(56) References Cited

U.S. PATENT DOCUMENTS

| | | | |
|---|---|---|---|
| 8,164,482 B2 * | 4/2012 | Lynam | B60Q 1/2665 340/904 |
| 8,683,722 B1 | 4/2014 | Cowan | |
| 9,321,395 B2 | 4/2016 | Ammar et al. | |
| 9,487,142 B2 | 11/2016 | Sobecki et al. | |
| 10,493,906 B2 * | 12/2019 | Favero | B60Q 1/323 |
| 2015/0224919 A1 | 8/2015 | Sobecki et al. | |
| 2017/0066386 A1 | 3/2017 | Sawada et al. | |
| 2017/0210282 A1 | 7/2017 | Rodriguez Barros | |

FOREIGN PATENT DOCUMENTS

| | | |
|---|---|---|
| CN | 204605666 U | 9/2015 |
| WO | 2018096523 A1 | 5/2018 |

* cited by examiner

*Primary Examiner* — Jason M Han
(74) *Attorney, Agent, or Firm* — Brooks Kushman, P.C.

(57) ABSTRACT

A vehicle lamp system, may include a lamp housing arranged within a vehicle winglet; and an optical assembly arranged within an optical housing and configured to project an image on a surface exterior to the vehicle from the winglet, the optical assembly having the optical housing configured to receive at least one interchangeable film configured to produce the image, the optical housing defining a slot configured to receive the film.

19 Claims, 17 Drawing Sheets

INTERCHANGEABLE LOGO COURTESY LAMP

TECHNICAL FIELD

Disclosed herein are interchangeable logo courtesy lamps.

BACKGROUND

Motor vehicles include various exterior and interior lamps for increasing visibility during non-daylight hours, as well as daylight hours for aesthetic reasons. These lamps may be automatic, and may include head-lamps, interior running lights, etc.

SUMMARY

A vehicle lamp system, may include a lamp housing arranged within a vehicle winglet; and an optical assembly arranged within an optical housing and configured to project an image on a surface exterior to the vehicle from the winglet, the optical assembly having the optical housing configured to receive at least one interchangeable film configured to produce the image, the optical housing defining a slot configured to receive the film.

An interchangeable vehicle lamp system for projecting an image exterior to a vehicle may include a lamp assembly arranged within a vehicle winglet; an optical assembly configured to be selectably receivable by the lamp assembly, the optical assembly including at least one film configured to produce the projected image; and a support arranged within the lamp assembly and configured to receive a proximal end of the optical assembly and align the film within the optical assembly with the lamp assembly during installation.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Disclosed herein is a lamp system for a vehicle that includes a lamp assembly configured to emit light and display an image, such as a logo or other customizable image. The lamp system may, at least in part, be interchangeable within a mirror assembly or winglet of a vehicle and may be an aftermarket accessory allowing customers to customize their lamp assembly with a specific logo or image.

Figure 1:
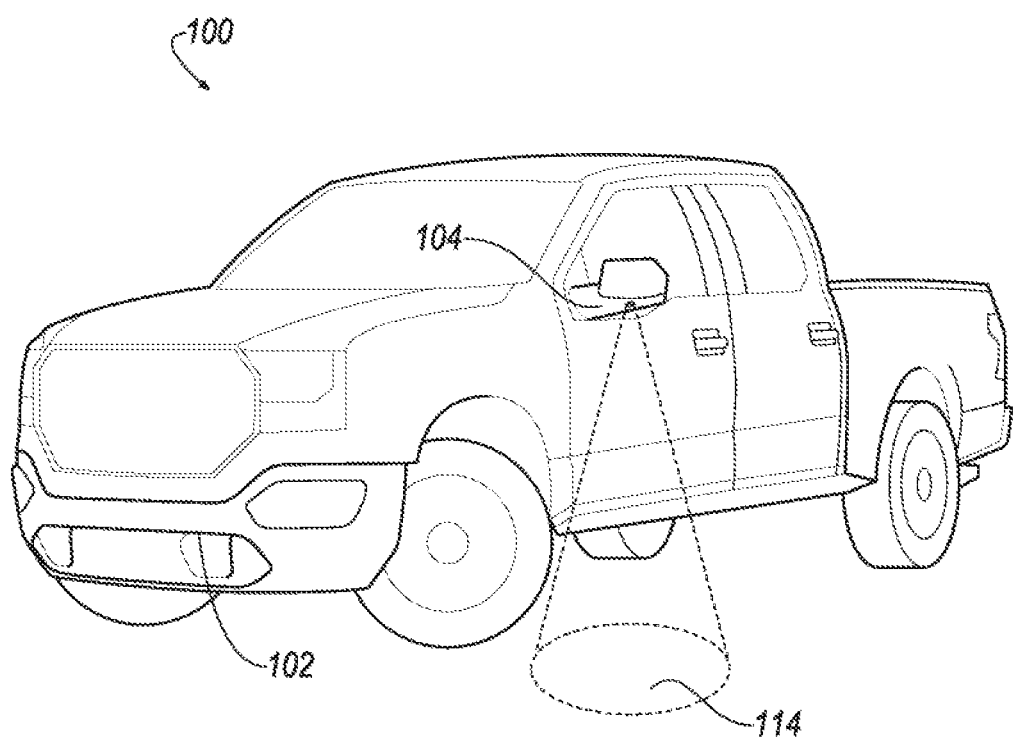
FIG. 1 illustrates an example vehicle lamp system for a vehicle.

FIG. 1 illustrates an example lamp system 100 for a vehicle 102. The vehicle 102 is illustrated as a truck, but may be any motor passenger vehicle including but not limited to a truck, sport utility vehicle, cross-over, hatchback, station wagon, motorcycle, all-terrain vehicle (ATV), recreational vehicle (RV), boat, plane or other mobile machine for transporting people or goods, etc.

The vehicle 102 may include at least one winglet 104, such as a side rearview viewing device (as shown in FIG. 1 and referred to herein as viewing assembly 116), or camera or radar or sensor array. The winglet 104 may also be a roof rack, door handle, or other protrusion of the vehicle or vehicle component. The winglet 104 may house a lamp assembly 120 (not labeled in FIG. 1) configured to create an illuminated area 114 at or near the vehicle 102. The illuminated portion, referred to herein as the illuminated area 114, may provide a lighted area in front of or to the side of the vehicle, as well as display an image, such as a logo, within the illuminated area 114.

While the lamp assembly 120 is described throughout as being arranged on the winglet 104 or the viewing assembly 116, the lamp assembly 120 may also be mounted on other exterior areas of the vehicle 102. For example, the lamp assembly 120 may be arranged on a door handle. The lamp assembly 120 may be arranged on running boards, mud flaps, roof racks, bumpers, etc. The vehicle 102 may include more than one lamp assembly 120. In one example, a lamp assembly 120 may be arranged on each exterior rearview mirror. A lamp assembly 120 may also be arranged on each door handle.

Figure 2:
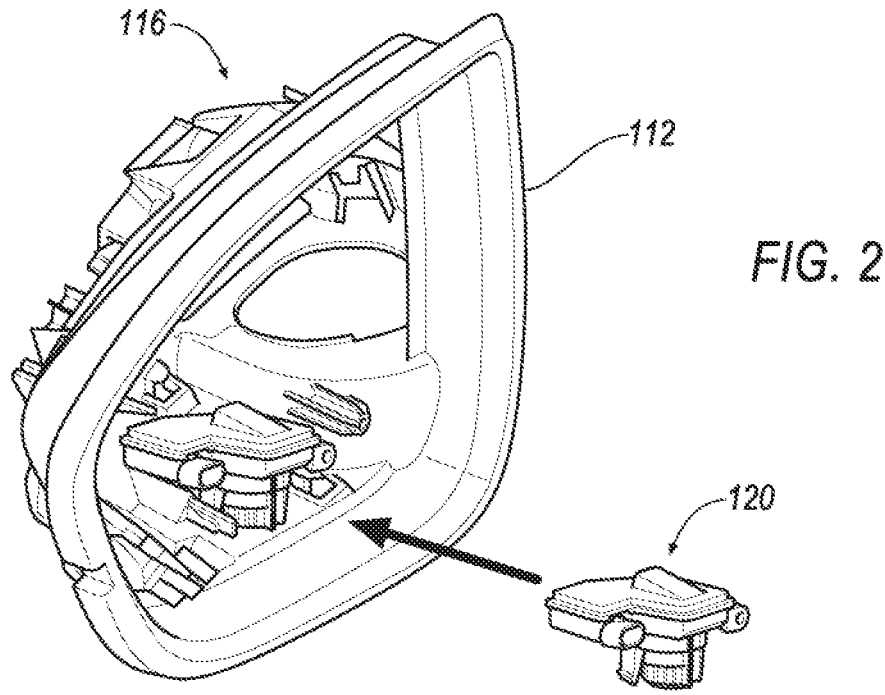
FIG. 2 illustrates a cut-away perspective view of an example viewing assembly of the lamp system of FIG. 1.

FIG. 2 illustrates a cut-away perspective view of an example viewing assembly 116 of the lamp system 100 of FIG. 1. The lamp assembly 120 may be arranged within a cavity 112 of the viewing assembly 116. A distal end 118 of the lamp assembly 120 may be exposed at the exterior of the viewing assembly 116 allowing light or projections to emit from the lamp assembly 120 onto the illumination area 114. The lamp assembly 120 may be inserted into the cavity 112 during manufacturing.

In this example, lamp assembly 120 may be configured to receive an interchangeable part (now shown in FIG. 2). The lamp assembly 120 may be easily changeable by the customer throughout use of the vehicle to allow for customization of the image or logo.

Figure 3:
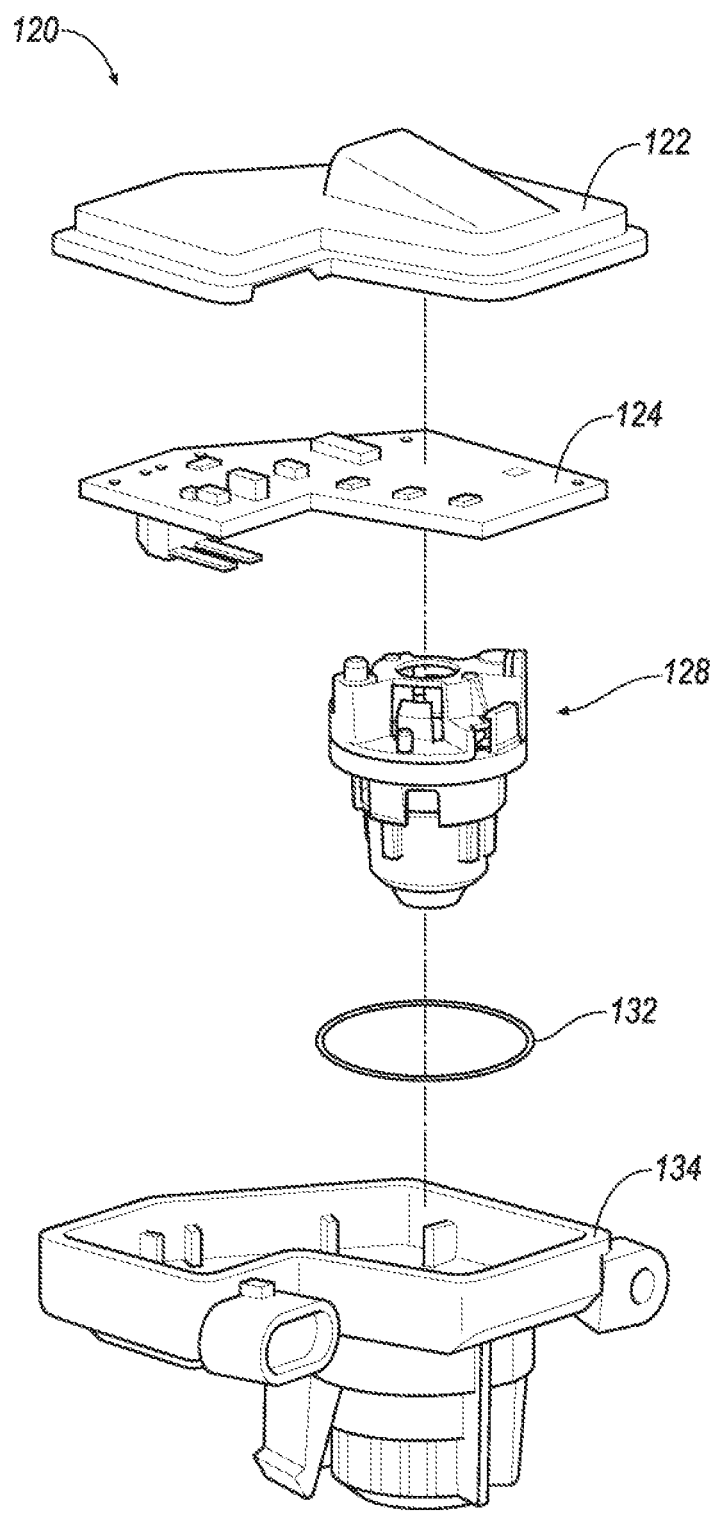
FIG. 3 illustrates an exploded view of an example lamp assembly of FIG. 2.

FIG. 3 illustrates an exploded view of an example lamp assembly 120 of FIG. 2. The lamp assembly 120 may include a lamp housing 134. The lamp housing 134 may be configured to receive an optical assembly 128. The optical assembly 128 may include various components, including a film 146 (shown in FIG. 4), which includes the logo or image. The film may include but is not limited to a polycarbonate (PC) component with coating having laser logo, polycarbonate (PC) component with etched logo, glass with coating having laser logo, glass with etched logo, poly (methyl methacrylate) (PMMA) component with coating having laser logo, poly(methyl methacrylate) (PMMA) component with etched logo, diffractive optical element, etc. An optional sealing ring 132 may be arranged between the lamp housing 134 and the optical assembly 128 to allow for a sealed fit between the distal end 118 of the lamp housing 134 and the optical assembly 128.

The film 146 may include one or more alignment features 147. The alignment features 147 may be configured to mate with the optical housing 152. The alignment features 147 may be a pair of protrusions extending radially outwardly from the film 146. The protrusions may be received by a lip 149 of the housing 152 and may be maintained between one or more projections 151 extending from the lip 149 to maintain the film 146 in a fixed location. The projections 151 and protrusions 147 may also aid in aligning the film when the film 146 is changed. That is, as the film 146 is interchanged to display a different logo or graphic, the protrusions 147 on the film may facilitate easy alignment within the housing 152.

The optical assembly 128 may be coupled to a controller 124. The controller 124 may be coupled to a memory (not shown) and may be configured to control the illumination of the optical assembly 128. The controller 124 may include a printed circuit board (PCB) and may further include connectors or wires. A potting or lamp cover 122 may cover the controller 124 and the optical assembly 128 once assembled and may hermetically seal the lamp housing 134. That is, the lamp cover 122 and the housing may be water-resistant sealed, for example, but not limited to, PCB coating, liquid ingress protection, solid particle protection, etc.

The lamp cover 122 may be a direct potting on the controller 124 or may be overmolded to the controller 124 at low pressure. The lamp cover may also be welded to the lamp housing 134, clipped to the lamp housing 134, fixed with a screw to the lamp housing 134, etc.

The film 146 may be a lens or filter configured to aid in generating the logo or image. Filters may selectively transmit lights of different wavelengths. The filters may be absorptive or dichroic. The filters may be selected during manufacturing depending on the type of image to be projected. Although not shown, a light or LED or plurality of LEDs configured to emit light may be included in the optical assembly 128.

Figure 4:
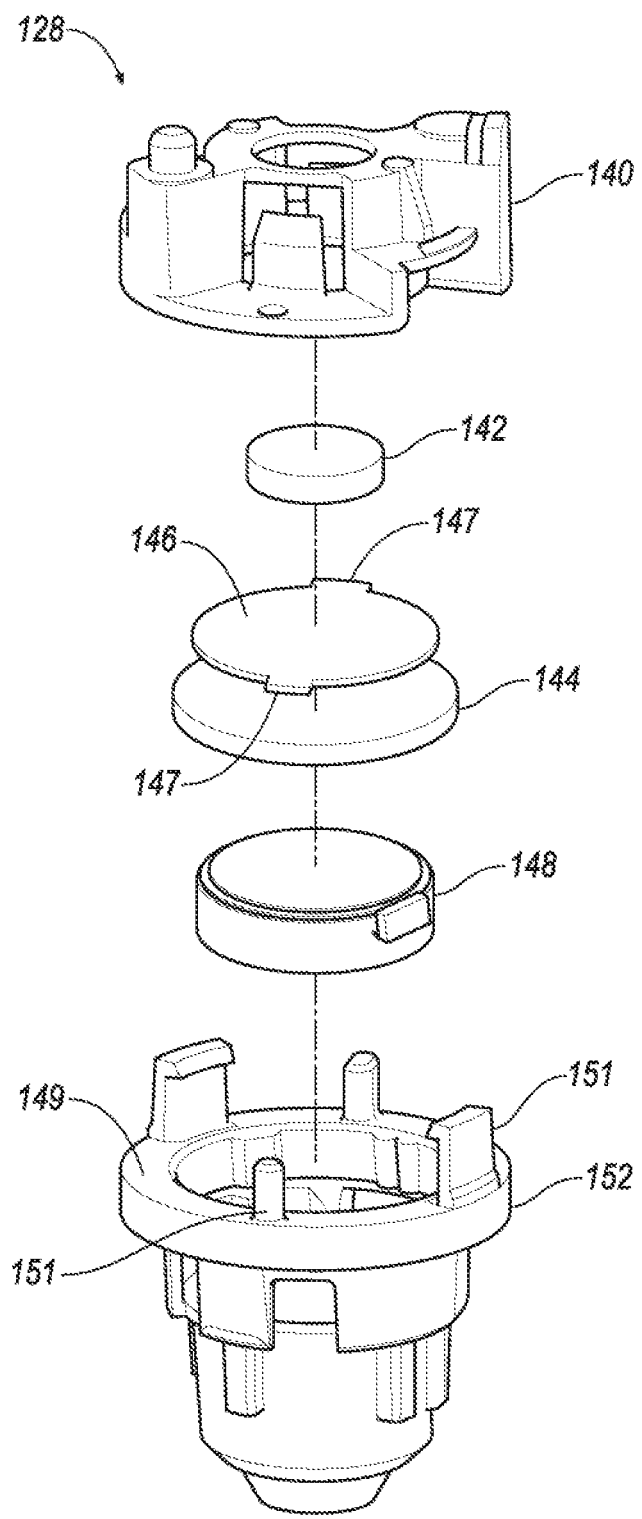
FIG. 4 illustrates an exploded view of an example optical assembly of FIG. 3.

FIG. 4 illustrates an exploded view of the example optical assembly 128 of FIG. 3. The optical assembly 128 may be interchangeable within the lamp assembly 120 allowing users or manufacturers to easily update or change the projected logo. The optical assembly 128 may include an optical housing 152. The optical housing 152 may be configured to be seated within the lamp housing 134 (shown in FIG. 3) at the distal end 118. The optical housing 152 may receive a plurality of lenses and at least one film 146. The film 146 may include the logo or image and determine what logo or image is displayed in the illumination area 114 during use. As explained, the film 146 may be a filter or lens configured to alter the illumination area 114. The film 146 may allow certain light to pass through the film 146, while blocking other light, in order to generate the image. This film 146 may be interchangeable at the manufacturing stages in order to customize the image for each optical assembly 128.

The lenses may include a first optical lens 142, a second optical lens 144 and a third optical lens 148. The film 146 may be arranged between the first optical lens 142 and the second optical lens 144. The optical lenses 142, 144, 148 may reflect or bend the projections and may interface with the film 146 to provide the projected image. An optical cover 140 may seal the lenses 142, 144, 148 and film 146 within the optical housing 152.

Figure 5:
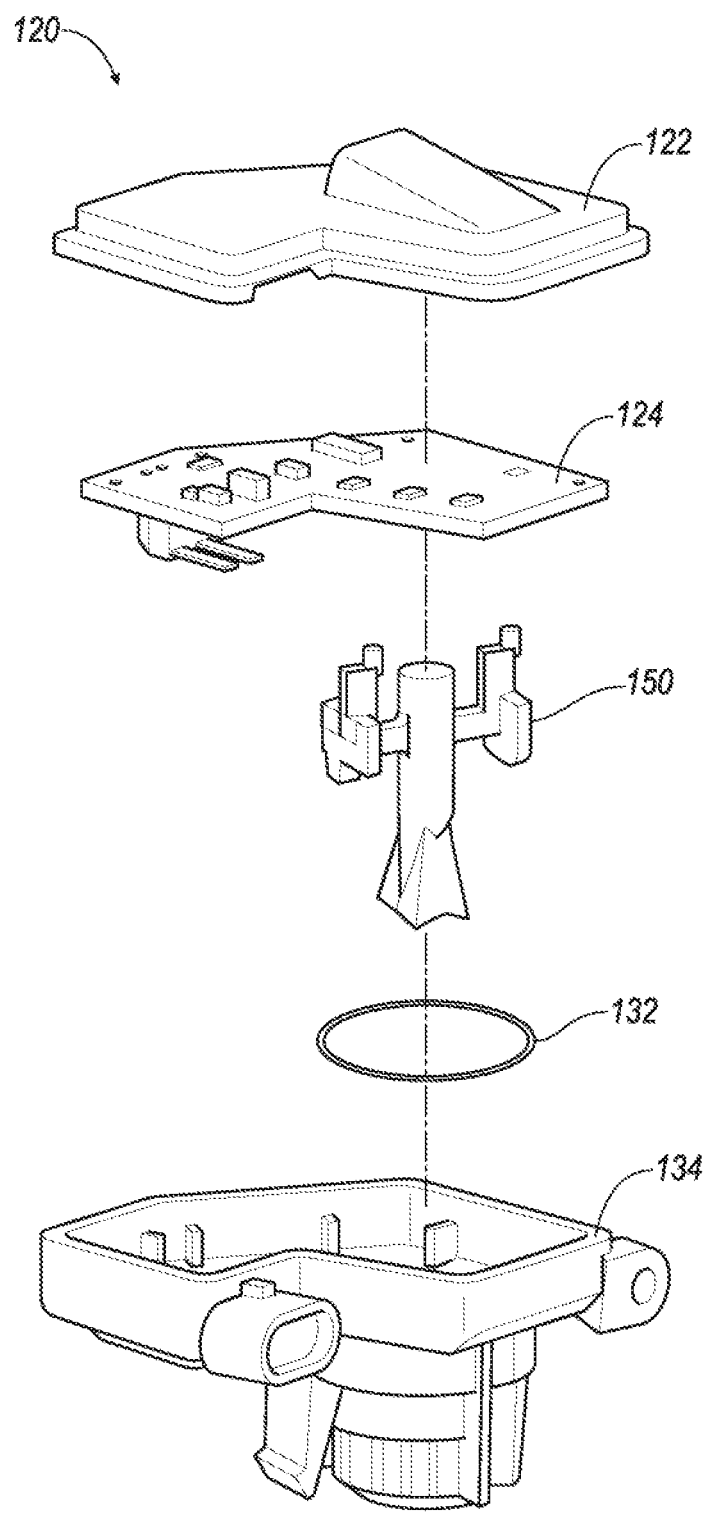
FIG. 5 illustrates an exploded view of another example lamp assembly of FIG. 2.

FIG. 5 illustrates an exploded view of another example lamp assembly 120 of FIG. 2. In this lamp assembly 120, the interchangeable part may include an optical prism 150. The optical prism 150 may include the logo or image and may be configured to bend the light and images so as to project the logo clearly within the illumination are 114. The optical prism 150 may be an optimal three dimensional shape which helps to create the logo or image. The prism 150 may not be in a single plane, but rather may be having curves or bends to better create a clear logo or image on the ground (e.g., may be similar to a hologram).

The lamp assembly 120 may, similar to FIG. 3, include the optional sealing ring 132 to seal the prism 150 within the lamp housing 134. The controller 124 may be connected to the prism 150 and may be configured to control the illumination thereof. The lamp cover 122 may cover and seal the lamp housing 134.

Figure 6:
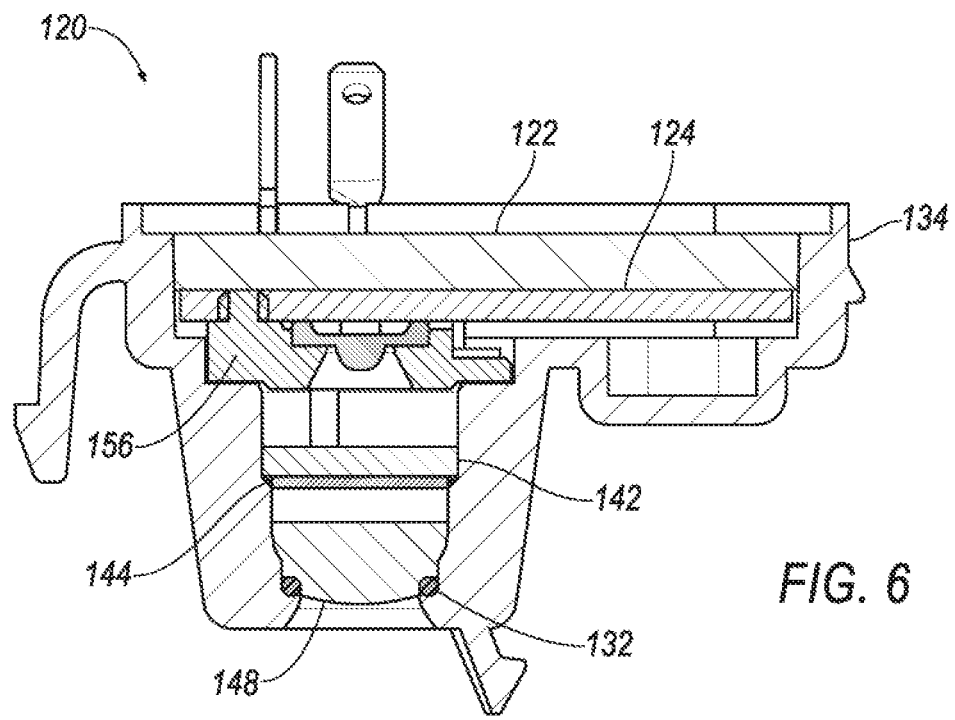
FIG. 6 illustrates a cut-away view of the example lamp assembly of FIG. 3.

FIG. 6 illustrates a cut-away view of the example lamp assembly 120 of FIG. 3. As illustrated, the optical assembly 128 may be arranged within the lamp assembly 120 where the projection leaves the lamp assembly 120 at the distal end 118. The optional sealing ring 132 may seal the optical assembly 128 within the lamp housing 134 and prevent undue movement within the housing 134 during use of the vehicle 102.

The lamp assembly 120 may include a support 156 configured to receive a proximal end of the optical assembly 128. The support 156 may define a recess configured to receive a centered projection of the optical cover 140. This may allow the optical assembly 128 to be easily seated and centered within the lamp assembly 120. The support 156 may include snaps or screws to ensure the centering of the lens and logo. For example, the optical cover 140 may screw into, or snap into, the support 156.

The first lens 142 may be arranged within the optical cover 140 at the proximal end thereof. Subsequently, the second lens 144, third lens 148, and film 146 are further arranged within the optical cover 140 and optical housing 152. The support 156 centers these components, allowing the optical assembly 128 to align with an opening 158 defined at the distal end 118 of the lamp housing 134.

The third lens 148 may be received within the optical housing 152. Additionally or alternatively, the third lens 148 may be overmolded or welded to the exterior of the optical housing 152 at the opening 158.

Figure 7:
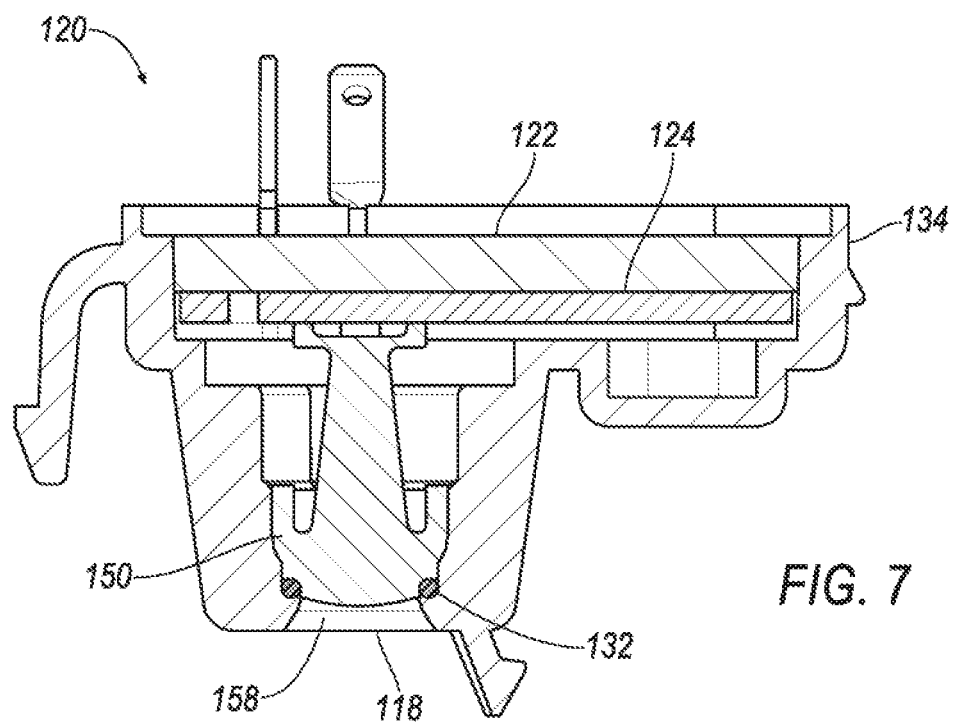
FIG. 7 illustrates a cut-away view of the example lamp assembly of FIG. 5.

FIG. 7 illustrates a cut-away view of the example lamp assembly 120 of FIG. 5. In this example, the interchangeable part is the optical prism 150. The prism 150 is seated within the optical housing 152 and connected to the controller 124. The optional sealing ring 132 maintains the prism 150 within the optical housing 152.

Figure 8:
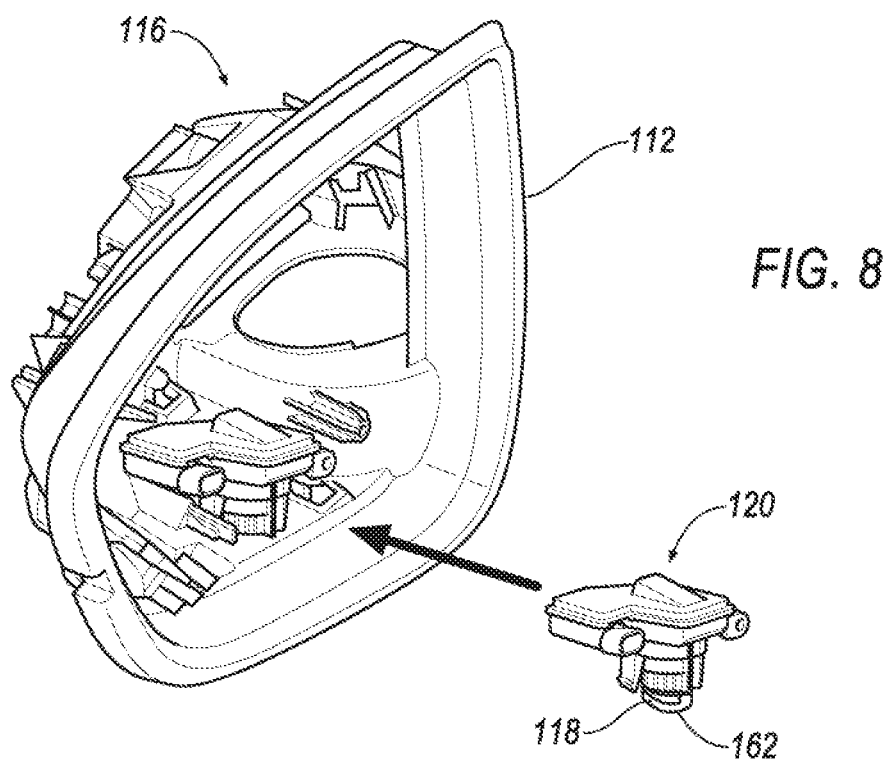
FIG. 8 illustrates a cut-away perspective view of another example viewing assembly of the lamp system of FIG. 1.

FIG. 8 illustrates a cut-away perspective view of another example viewing assembly 116 of the lamp system 100 of FIG. 1. Similar to FIG. 2, the lamp assembly 120 may be arranged within a cavity 112 of the viewing assembly 116. The distal end 118 of the lamp assembly 120 may be exposed at the exterior of the viewing assembly 116 allowing light or projections to emit from the lamp assembly 120 onto the illumination area 114. The lamp assembly 120 may be inserted into the cavity 112 during manufacturing.

In this example, lamp assembly 120 may be configured to receive an interchangeable part (now shown in FIG. 8). The lamp assembly 120 may be easily changeable by the customer throughout use of the vehicle to allow for customization of the image or logo. The lamp assembly 120 may include a lamp lens 160 at the distal end 118.

Figure 9:
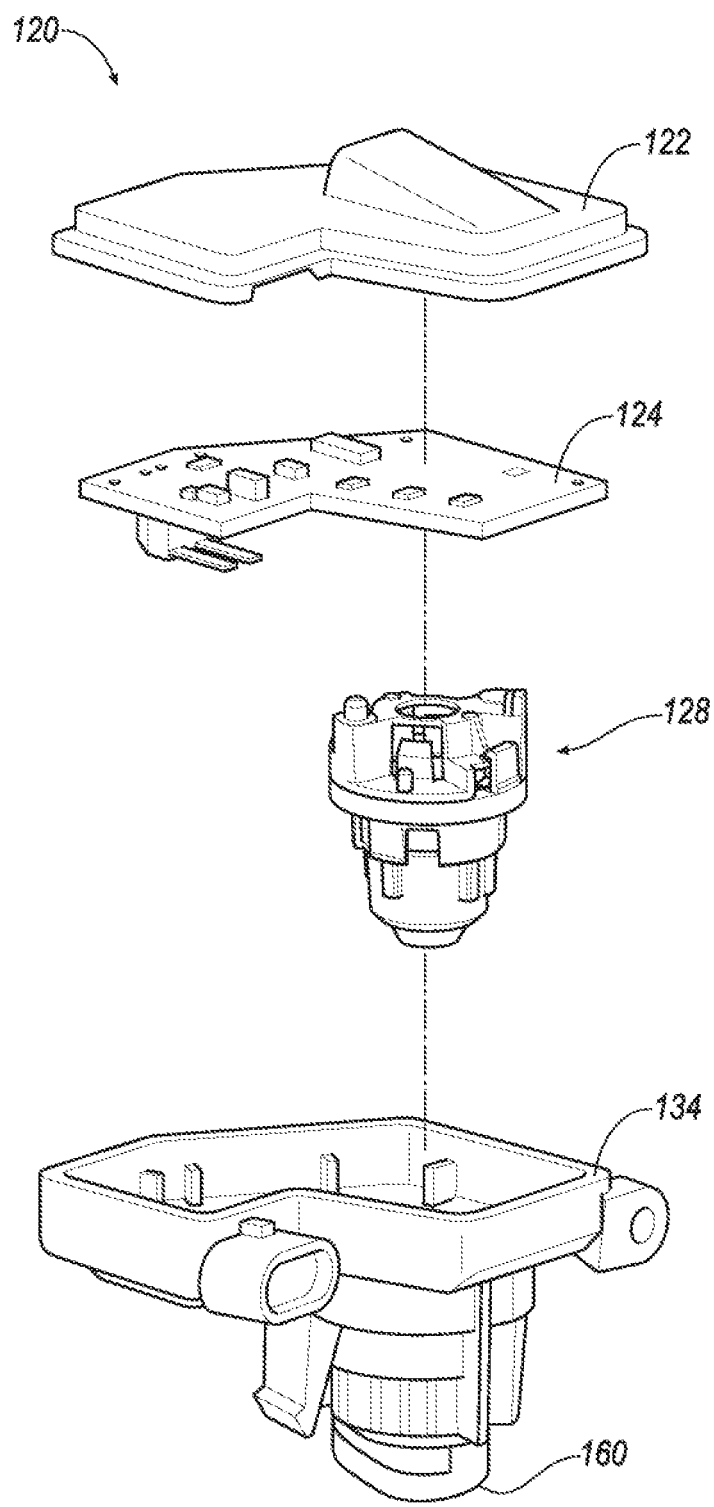
FIG. 9 illustrates an exploded view of an example lamp assembly of FIG. 8.

FIG. 9 illustrates an exploded view of an example lamp assembly 120 of FIG. 8. FIG. 9 is similar to FIG. 3, without showing the optional sealing ring 132 and including the lamp lens 160. The lamp lens 160 may be fit into the lamp housing 134 at the distal end 118. As explained above, the lamp housing 134 may be configured to receive the optical assembly 128, which is coupled to the controller 124 and sealed by the lamp cover 122. The optical assembly 128 may be similar to that of FIG. 4.

Figure 10:
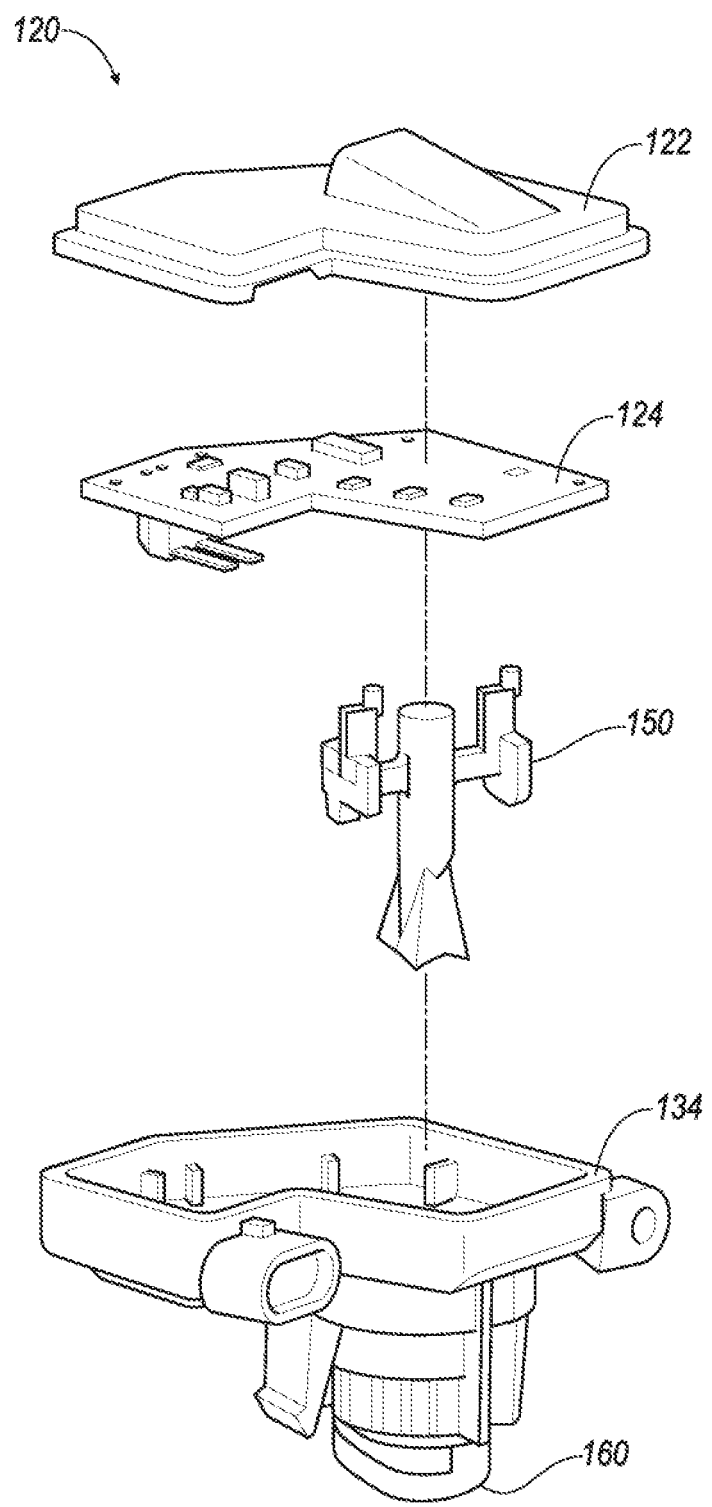
FIG. 10 illustrates an exploded view of an example optical assembly of FIG. 9.

FIG. 10 illustrates an exploded view of another example lamp assembly 120 of FIG. 8. Similar to FIG. 5, the interchangeable part may be the optical prism 150. The controller 124 may be connected to the prism 150 and may be configured to control the illumination thereof. The lamp cover 122 may cover and seal the lamp housing 134. The lamp lens 160 may be arranged at the distal end 118 of the lamp housing 134.

Figure 11:
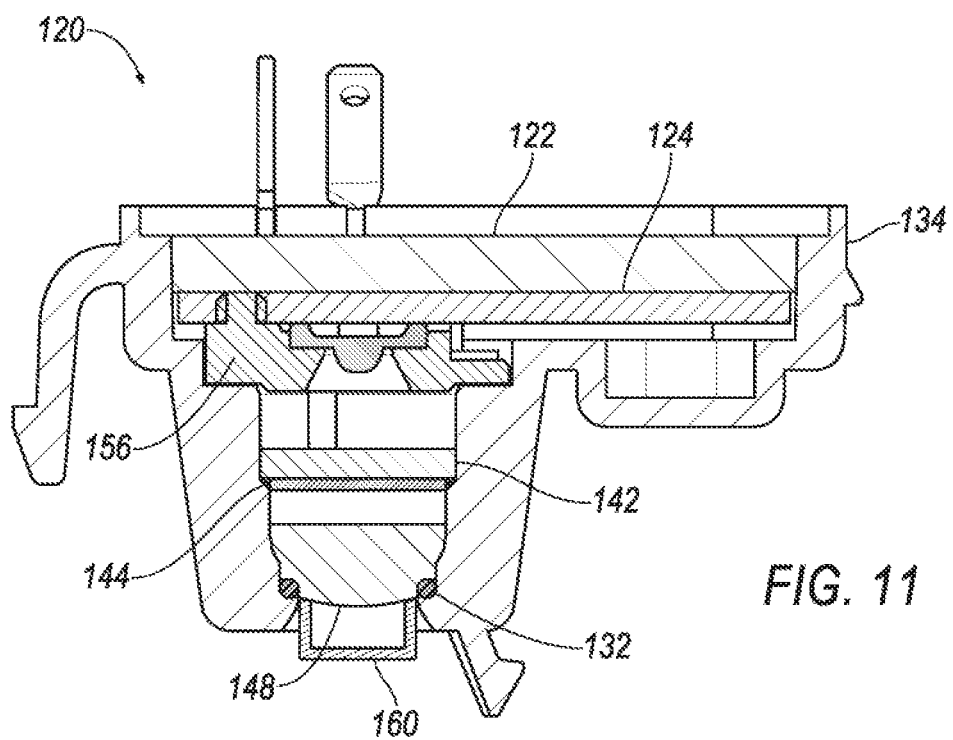
FIG. 11 illustrates a cut-away view of another example lamp assembly of FIG. 8.

FIG. 11 illustrates a cut-away view of the example lamp assembly 120 of FIG. 10. As illustrated, the optical assembly 128 may be arranged within the lamp assembly 120 where the projection leaves the lamp assembly 120 at the distal end 118. The lamp assembly 120 may include the support 156 configured to receive the proximal end of the optical assembly 128 to allow the optical assembly 128 to be easily seated and centered within the lamp assembly 120.

The lamp lens 160 may be overmolded or welded onto the lamp housing 134. Additionally or alternatively, the lamp lens 160 may be received by the opening 158.

Figure 12:
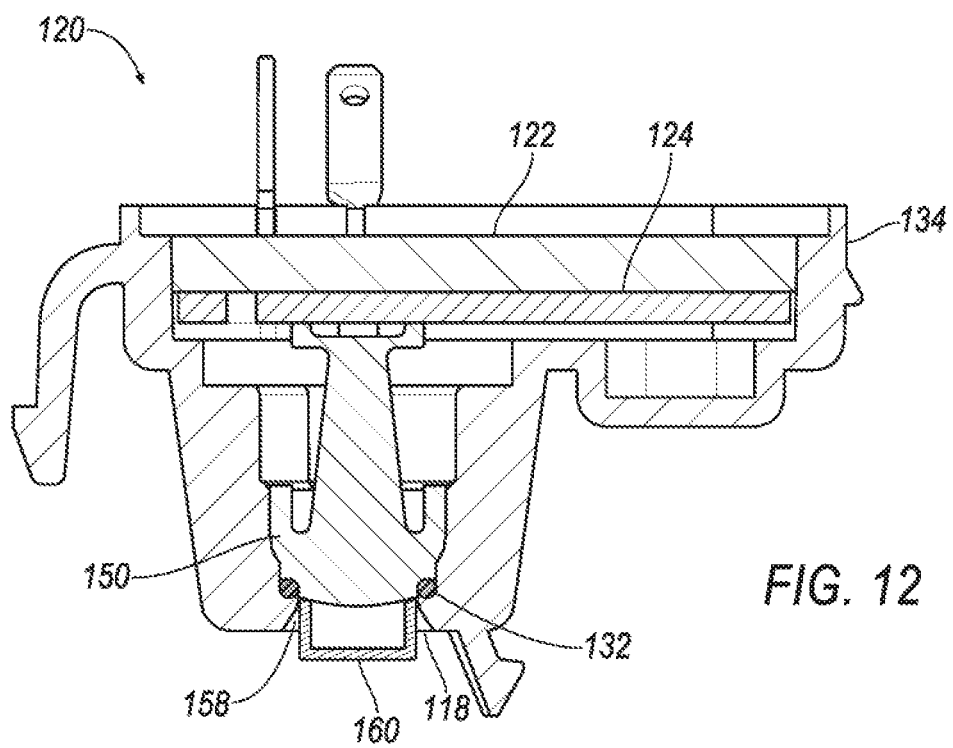
FIG. 12 illustrates a cut-away view of the example lamp assembly of FIG. 10.

FIG. 12 illustrates a cut-away view of the example lamp assembly 120 of FIG. 10. In this example, the interchangeable part is the optical prism 150. The prism 150 is seated within the optical housing 152 and connected to the controller 124.

Figure 13:
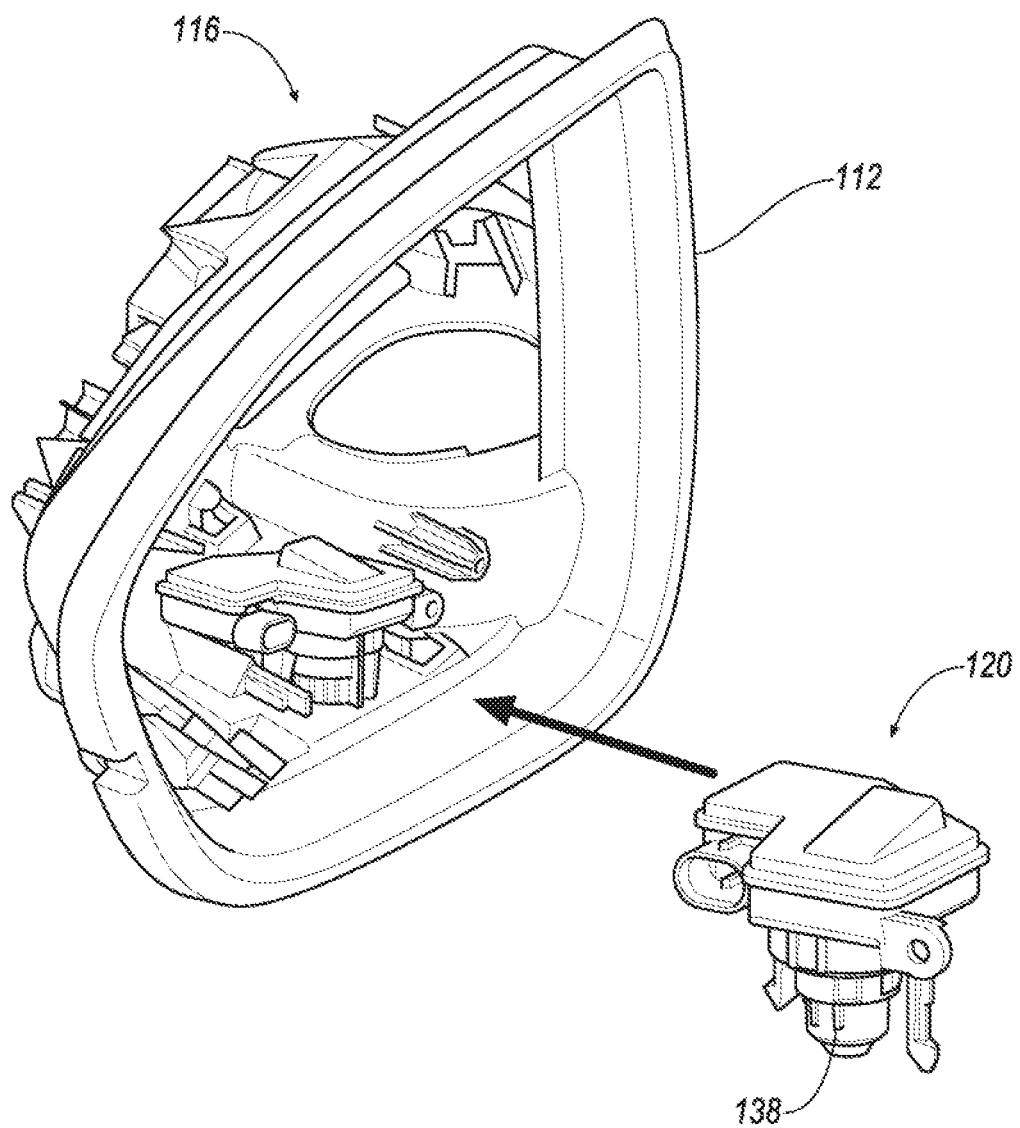
FIG. 13 illustrates a perspective cut-away view of the example lamp assembly of FIG. 11.

FIG. 13 illustrates a cut-away perspective view of another example viewing assembly 116 of the lamp system 100 of FIG. 1. The lamp assembly 120 may be arranged within the cavity 112 of the viewing assembly 116. The distal end 118 of the lamp assembly 120 may be exposed at the exterior of the viewing assembly 116 allowing light or projections to emit from the lamp assembly 120 onto the illumination area 114. The lamp assembly 120 may be inserted into the cavity 112 during manufacturing.

The distal end 118 of the lamp assembly 120 may be configured to receive an interchangeable part 138 after manufacturing. The interchangeable part 138 may include the logo or image and may be easily changeable by the customer throughout use of the vehicle 102. The interchangeable part 138 is described in more detail herein and may be one of the optical assembly 128 and/or the optical prism 150.

By exposing the interchangeable part 138 at the distal end 118, the user may easily insert and remove the interchangeable part 138 at his or her leisure, allowing for a customizable logo or image to be displayed within the illumination area 114.

Figure 14:
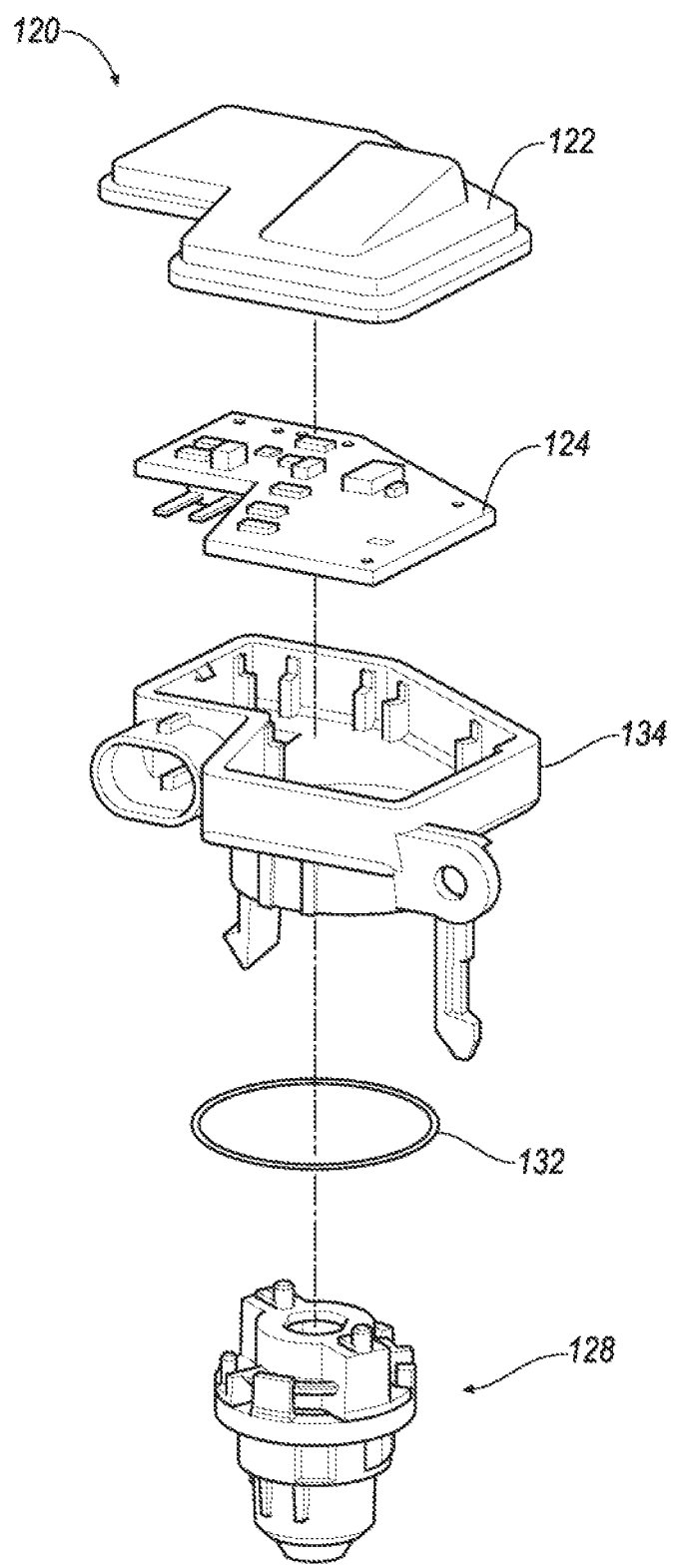
FIG. 14 illustrates an exploded view of another example viewing assembly of the lamp system of FIG. 13.

FIG. 14 illustrates an exploded view of an example lamp assembly 120 of FIG. 13. The lamp assembly 120 may include a lamp housing 134. The lamp housing 134 may be configured to receive the interchangeable part 138 (in this example, the optical assembly 128) at the distal end 118. The optional sealing ring 132 may be arranged between the lamp housing 134 and the optical assembly 128 to allow for a sealed fit between the distal end 118 of the lamp housing 134 and the optical assembly 128. The sealing ring 132 may be inserted at the distal end 118 prior to the optical assembly 128 being assembled.

The controller 124 may be received by the lamp housing 134 at an opposite end of the optical assembly 128. The lamp cover 122 may cover the controller 124 and the optical assembly 128 once assembled and may hermetically seal the lamp housing 134. The lamp cover 122 may be a direct potting on the controller 124 or may be overmolded to the controller 124 at low pressure or may be welded to the lamp housing 134 or may be clipped to the lamp housing 134 or may be fixed with a screw to the lamp housing 134.

Figure 15:
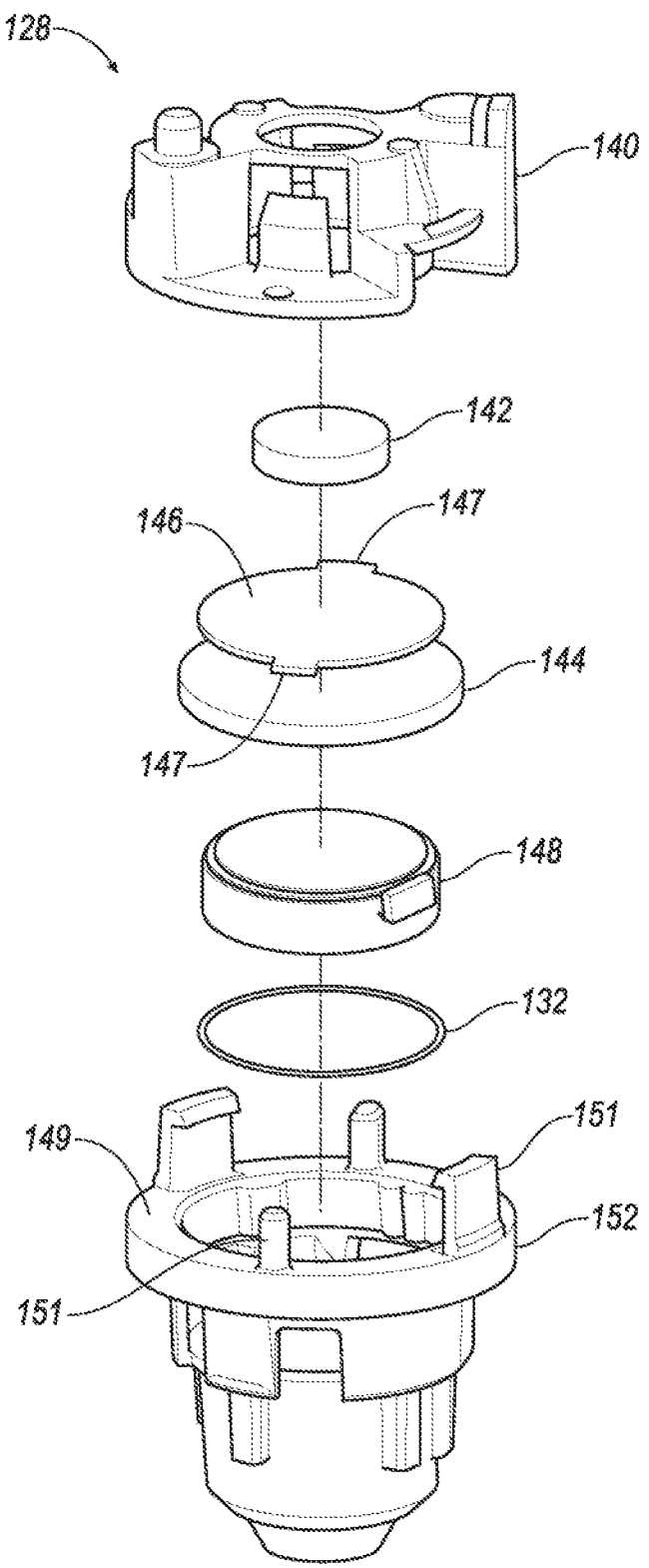
FIG. 15 illustrates an exploded view of an example of the assembly of FIG. 14.

FIG. 15 illustrates an exploded view of an example optical assembly 128 of FIG. 14. This example may be similar to FIG. 4 and may include an optional sealing ring 132 arranged within the optical housing 152 and between the optical housing 152 and the third lens 148. The third lens 148 may be overmolded on the optical housing 152 without a grommet.

Figure 16:
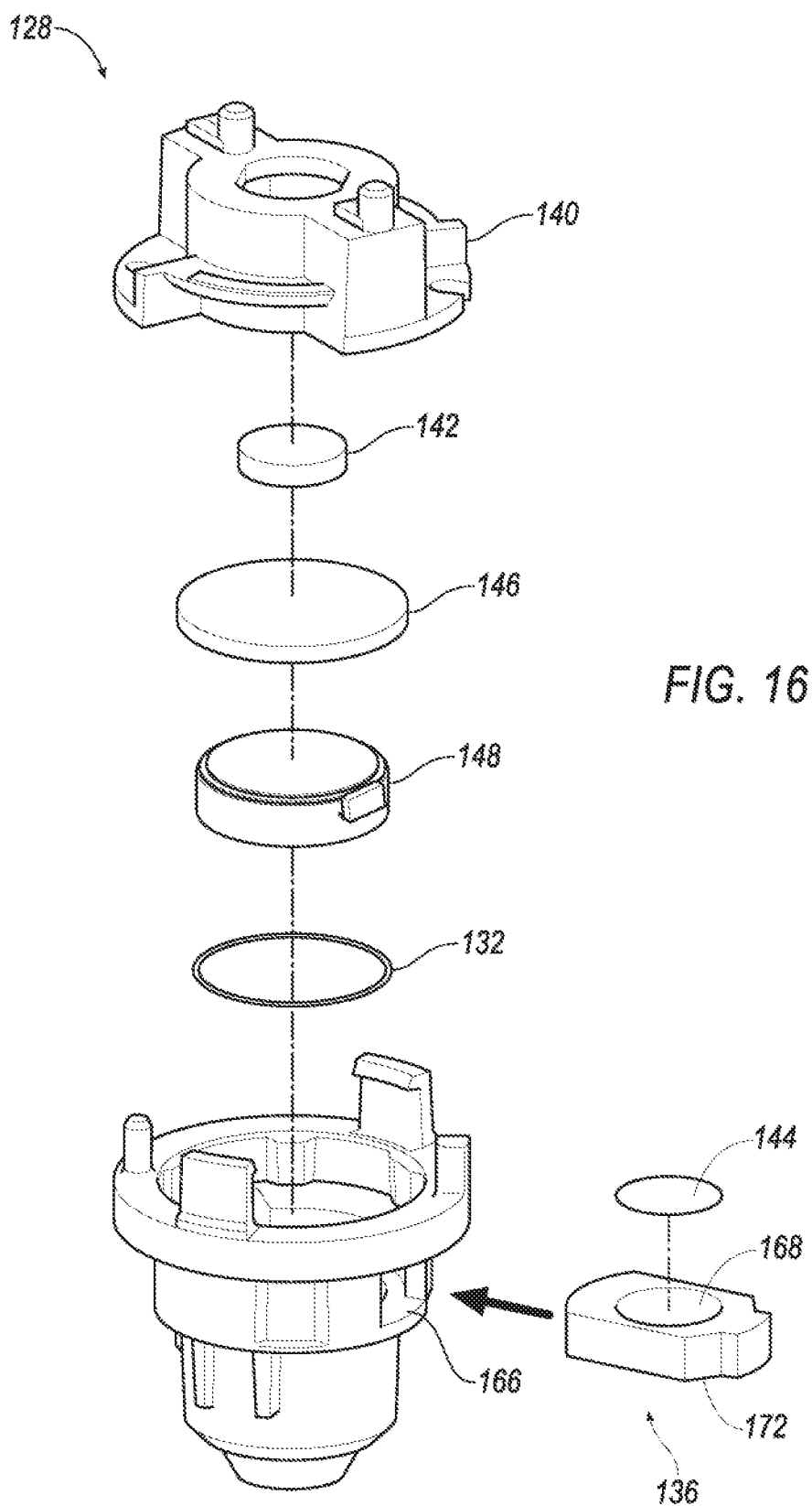
FIG. 16 illustrates an exploded view of an example optical assembly of FIG. 15.

FIG. 16 illustrates an exploded view of another example optical assembly 128 of FIG. 14. In this example, the optical assembly 128 may include a slide mount 136 configured to receive the film 146 within a recess 168. The slide mount 136 may be an aftermarket part configured to be interchanged by the user periodically. The slide mount 136 may include a specific film 146 including a specific logo or image. If the user wishes to change the logo or image displayed in the illumination area 114, the user may simply swap out the slide mount 136.

The optical housing 152 may define a slot 166 configured to receive the slide mount 136. The slide mount 136 may be inserted and removed from the optical housing 152. The slide mount 136 may include a notch 172 to allow the user to easily grip the slide mount 136. The film 146 within the slide mount 136, once installed, may align with the lenses 142, 144, 148.

During use, in order to change the slide mount 136, the user may unsecure the optical housing 152 from the lamp housing 134. This may be done by unscrewing, unlatching, or simply pulling the optical housing 152 out of the lamp housing 134. Once separated, or at least partially separated from the lamp housing 134, the slot 166 may be exposed and allow for removal and insertion of the slide mount 136.

Figure 17:
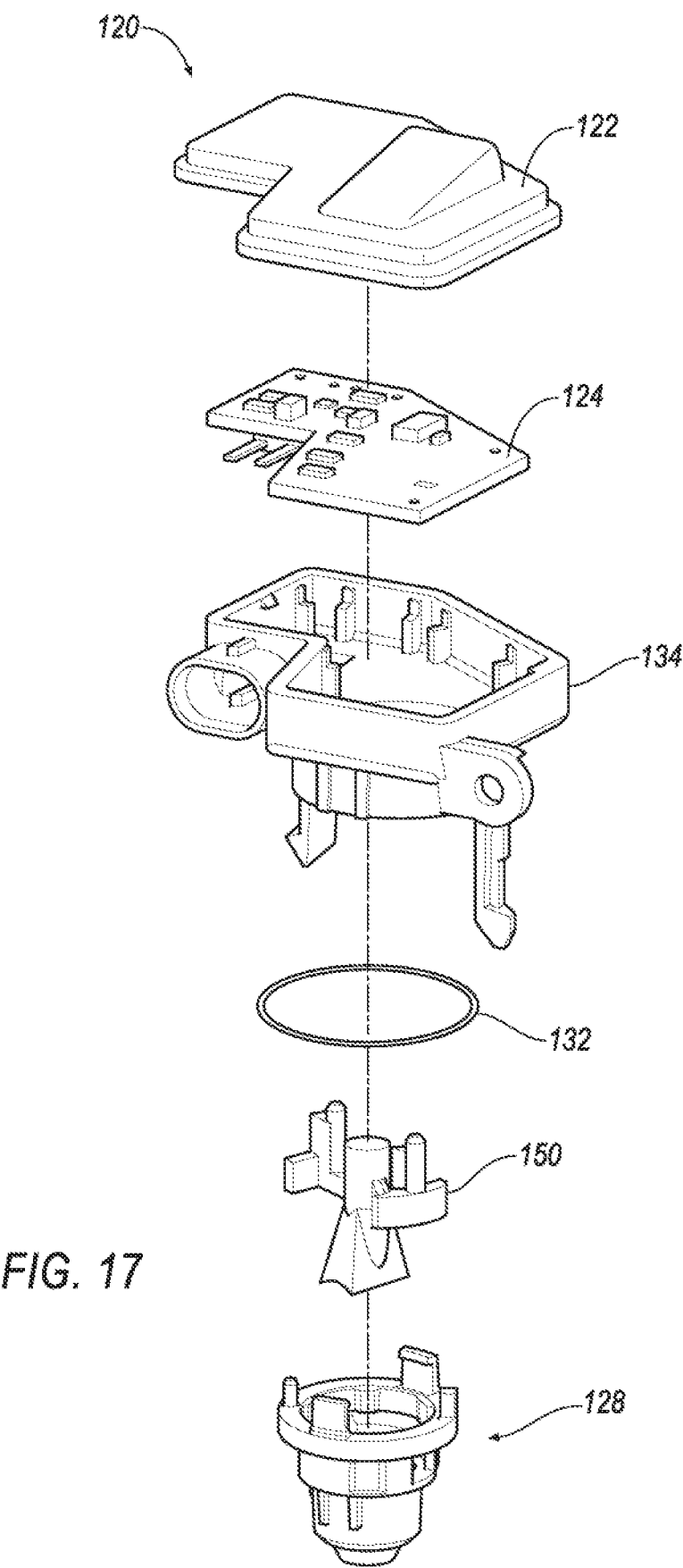
FIG. 17 illustrates an exploded view of another example optical assembly of FIG. 14.

FIG. 17 illustrates an exploded view of the example lamp assembly 120 of FIG. 14. In this example, the optical prism 150 is housed within the optical housing 152 that is arranged at the distal end 118 of the lamp housing 134. The optical prism 150 may be selectively removable by the user by unseating the optical housing 152 from the lamp housing 134 and replacing the prism 150 therein to include a new logo or image.

Figure 18:
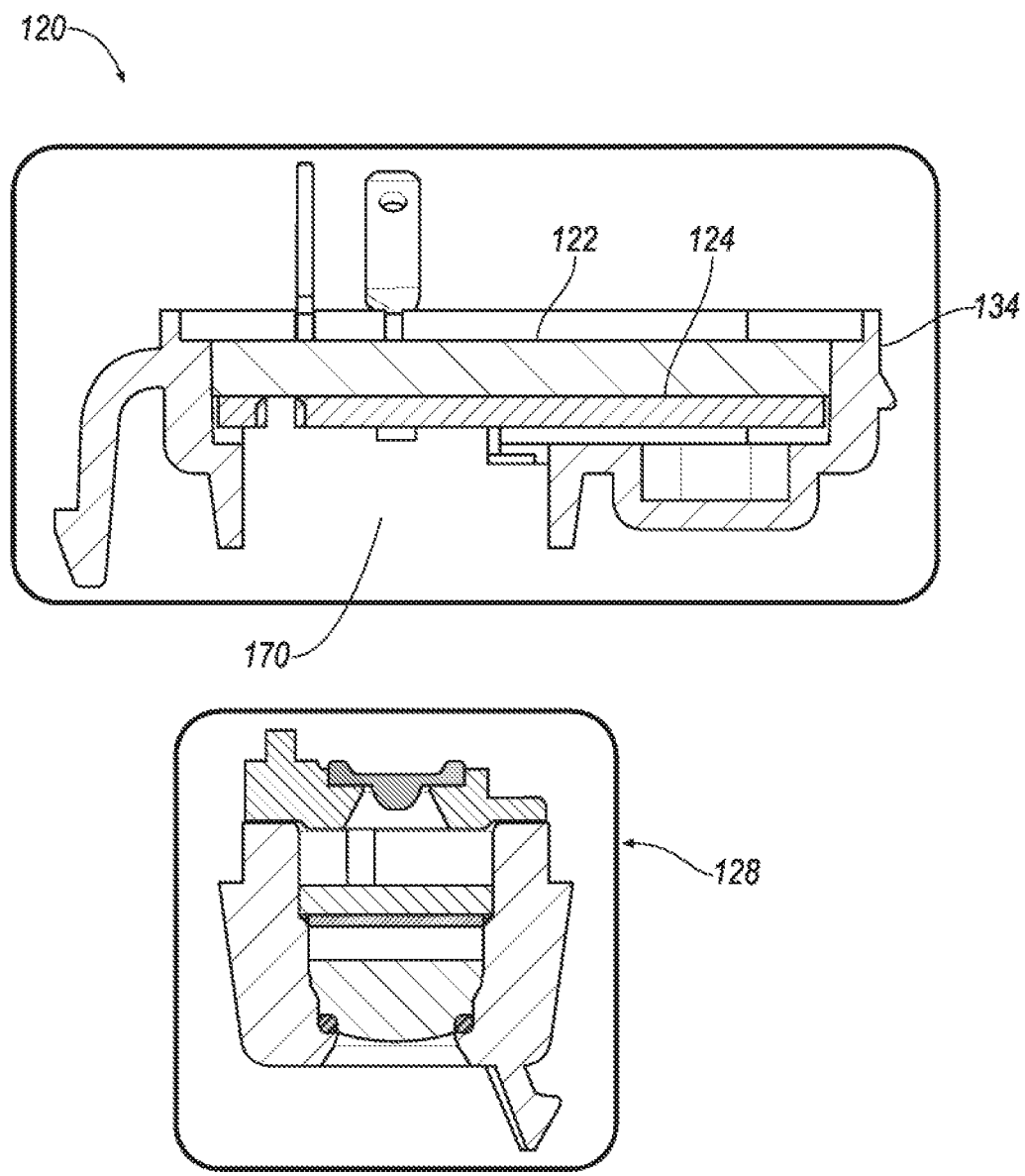
FIG. 18 illustrates an exploded view of an example lamp assembly of FIG. 14.

FIG. 18 illustrates a cut-away view of the example lamp assembly 120 of FIG. 14 and the optical assembly 128 of FIG. 15. In this example, the optical assembly 128, or a least a portion thereof, is removable from the lamp assembly 120. The optical housing 152 may be received by the lamp housing 134. The controller 124 may be housed by the lamp housing 134 and connectable to the optical assembly 128. The lamp housing 134 may define an optical opening 170 configured to receive the lamp housing 134. The two components may form a snap-fit, screw, latch, pin, etc., to selectively attach to each other.

Figure 19:
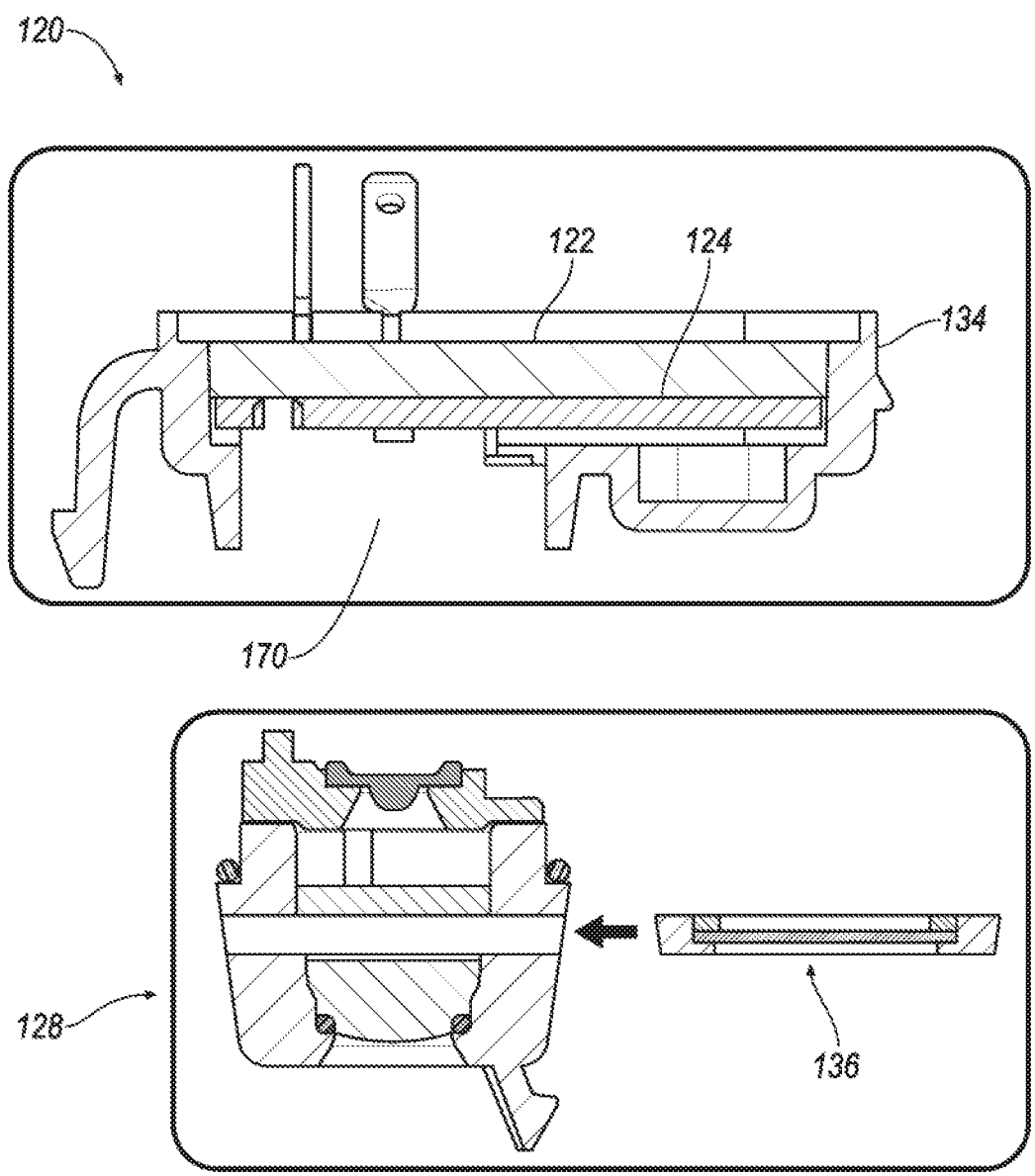
FIG. 19 illustrates a cut-away view of the example lamp assembly of FIG. 15 and the optical assembly of FIG. 16.

FIG. 19 illustrates a cut-away view of the example lamp assembly 120 of FIG. 15 and the optical assembly 128, including the removable slide mount 126, of FIG. 16. Similar to FIG. 18, the optical housing 152 in FIG. 19 is also selectively removeable from the lamp housing 134. The optical housing 152 may define the slot 166 configured to receive the removable slide mount 136. Upon removable of the optical housing 152 from the lamp housing 134, the slot 166 may be exposed, thus allowing the user to easily access the slide mount 136 and interchange the same.

Figure 20:
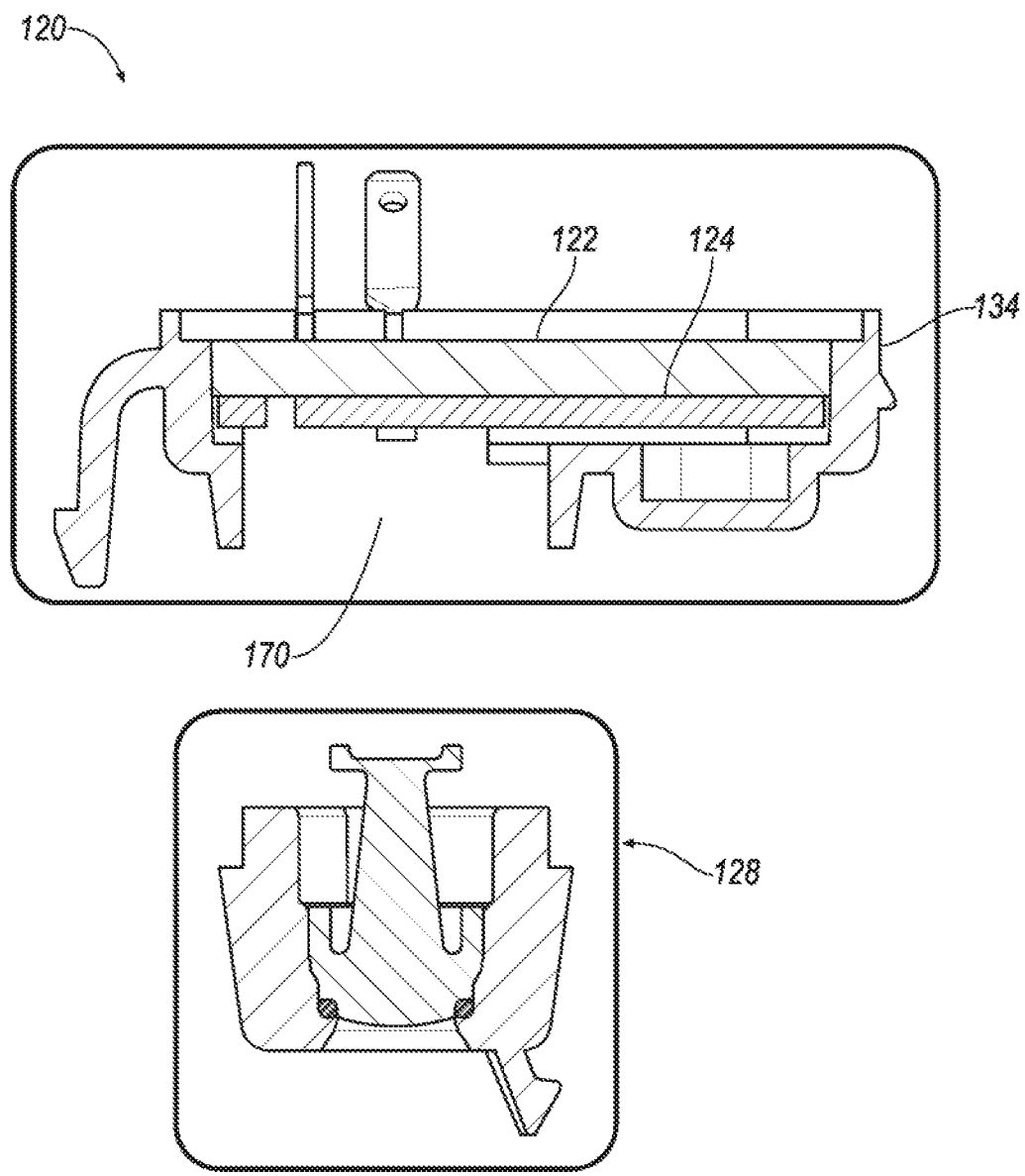
FIG. 20 illustrates a cut-away view of the example lamp assembly of FIG. 15 and the optical assembly of FIG. 17.

FIG. 20 illustrates a cut-away view of the example lamp assembly 120 of FIG. 17. Similar to FIG. 18, the optical housing 152 in FIG. 19 is also selectively removeable from the lamp housing 134. The optical housing 152 may include the prism 150 configured to engage with the controller 124 in an installed state. The controller 124 may be a laser or LED illumination device.

Accordingly, an aftermarket optical device and lamp assembly is disclosed herein allowing a user to interchange films to project various images and logos exterior of the vehicle.

Computing devices described herein generally include computer-executable instructions, where the instructions may be executable by one or more computing or hardware devices, such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions (e.g., from a memory, a computer-readable medium, etc.) and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle lamp system, comprising:
   a lamp housing arranged within a vehicle winglet;
   an optical assembly arranged within an optical housing and configured to project an image on a surface exterior to the vehicle from the winglet, the optical assembly having the optical housing configured to receive at least one interchangeable film configured to produce the image, the optical housing defining a slot configured to receive the film,
   wherein the optical housing contains a first optical lens, a second optical lens, and a third optical lens, and further wherein the film is arranged between two of the optical lenses.

2. The system of claim 1, further comprising a slide mount configured to receive the film, the slot defined by the optical housing configured to receive the slide mount.

3. The system of claim 2, wherein the slide mount includes a notch.

4. The system of claim 1, wherein the optical assembly is selectably removable from the lamp housing to expose the slot.

5. The system of claim 1, wherein at least one of the lenses is configured to interface with the film to generate the projected image.

6. The system of claim 1, wherein the optical housing and the lamp housing are water-resistant sealed.

7. The system of claim 1, further comprising at least one sealing ring arranged between the optical housing and the lamp housing to create a seal.

8. The system of claim 1, further comprising at least one controller in communication with the optical assembly and configured to control the projected image.

9. The system of claim 8 further comprising at least one housing cover configured to connect with the lamp housing and seal the controller within the lamp housing.

10. An interchangeable vehicle lamp system for projecting an image exterior to a vehicle, comprising:
    a lamp assembly arranged within a vehicle winglet;
    an optical assembly configured to be selectably receivable by the lamp assembly, the optical assembly configured to produce the projected image, the optical assembly containing three sequential optical lenses with at least one film arranged therebetween; and
    a support arranged within the lamp assembly and configured to receive a proximal end of the optical assembly and align the three lenses within the optical assembly with the lamp assembly during installation.

11. The system of claim 10, wherein the optical assembly includes an optical housing defining a keyed alignment feature configured to receive the film.

12. The system of claim 11, wherein the optical assembly is selectively removable from the lamp assembly to expose the keyed alignment feature.

13. The system of claim 12, wherein the keyed alignment feature includes at least one protrusion configured to mate with the optical housing.

14. The system of claim 10, wherein the optical assembly includes at least one optical prism to generate the projected image.

15. The system of claim 10, wherein the optical housing and the lamp housing are water-resistant sealed.

16. The system of claim 11, further comprising at least one controller in communication with the optical assembly and configured to control the projected image.

17. The system of claim 16, further comprising at least one housing cover configured to seal the controller within the lamp assembly.

18. The system of claim 10, wherein the winglet is a vehicle side rearview viewing device.

19. The system of claim 10, wherein the lamp assembly is at least one of clipped and threaded to the optical housing.

* * * * *